US011356333B2

(12) United States Patent
Pang et al.

(10) Patent No.: US 11,356,333 B2
(45) Date of Patent: Jun. 7, 2022

(54) PREDICTING FORWARDING DESTINATIONS FOR PACKETS (71) Applicant: Arista Networks, Inc., Santa Clara, CA (US)

(72) Inventors: James Chun Pang, Vancouver (CA); James Walter Shephard, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 56 days.

(21) Appl. No.: 16/752,395

(22) Filed: Jan. 24, 2020

(65) Prior Publication Data

US 2021/0234768 A1    Jul. 29, 2021

(51) Int. Cl.
*H04L 41/147*    (2022.01)
*H04L 43/50*    (2022.01)

(52) U.S. Cl.
CPC ........... *H04L 41/147* (2013.01); *H04L 43/50* (2013.01)

(58) Field of Classification Search
CPC ......... H04L 69/22; H04L 45/38; H04L 45/74; H04L 41/00; H04L 43/04; H04L 43/08; H04L 43/10; H04L 47/2441; H04L 47/2483; H04L 49/3009; H04L 49/3027; H04L 49/3063; H04L 41/147; H04L 43/50
See application file for complete search history.

(56) References Cited

U.S. PATENT DOCUMENTS

| 10,805,199 B1* | 10/2020 | Ramabadran | H04L 43/10 |
| 2007/0211640 A1* | 9/2007 | Palacharla | H04L 49/555 370/241 |
| 2007/0223388 A1* | 9/2007 | Arad | H04L 43/106 370/252 |
| 2013/0010600 A1* | 1/2013 | Jocha | H04L 43/062 370/236.2 |
| 2013/0136011 A1* | 5/2013 | Tardo | H04L 63/1416 370/252 |
| 2014/0119203 A1* | 5/2014 | Sundaram | H04L 43/10 370/250 |
| 2014/0153406 A1* | 6/2014 | Brolin | H04L 43/50 370/241.1 |
| 2014/0169158 A1* | 6/2014 | Mishra | H04L 49/3009 370/228 |
| 2019/0253335 A1* | 8/2019 | Yadav | H04L 43/50 |
| 2020/0162589 A1* | 5/2020 | Vijayadharan | H04L 41/0893 |
| 2020/0313999 A1* | 10/2020 | Lee | H04L 43/0847 |

* cited by examiner

*Primary Examiner* — Glenton B Burgess
*Assistant Examiner* — Rachel J Hackenberg
(74) *Attorney, Agent, or Firm* — Fountainhead Law Group P.C.

(57) ABSTRACT

Some embodiments provide a method, executable by a network device, that receives a set of commands specifying an ingress interface of the network device and a set of packet attributes. The method further generates a test packet based on the set of packet attributes. The method also injects the test packet into a hardware packet processing pipeline of the network device so that the test packet appears, from the perspective of the hardware packet processing pipeline, to be received at the ingress interface of the network device. The method further processes the test packet through the hardware packet processing pipeline of the network device. The method also captures the test packet before the test packet exits an egress interface of a plurality of egress interfaces of the network device.

20 Claims, 11 Drawing Sheets

PREDICTING FORWARDING DESTINATIONS FOR PACKETS

BACKGROUND

Often times, network operators may need to track down where specific flows of network traffic are being transmitted through a network. For example, network operators can do this when users of the network complain about network connectivity issues. With large production networks, the volume of network traffic through such networks makes tracking specific flows through the networks a daunting task. Tracking flows through networks provides visibility into how a packet is forwarded through network switches, thereby allowing which interfaces a packet would egress out of to be determined. Typical use cases include but are not limited to determining egress members for Port-Channels and equal cost multipath (ECMP) routes.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Different techniques may be used to track network flows transmitted through a network device. For example, a mirroring technique copies and redirects network traffic (e.g., ingress network traffic, egress network traffic, etc.) to a monitoring device connected via a dedicated mirroring destination port on the network device. As another example, a sampled flow (e.g., sFlow) tracking technique randomly samples ingress network traffic received by a network device. Many of the network flow tracking techniques are implemented in software. As such, these techniques are computationally expensive as they typically use a lot of resources (e.g., memory, processors, etc.) of the network device.

Described herein are techniques for predicting forwarding destinations for network devices using the forwarding hardware of the network devices. In some embodiments, a network device provides a tool to test where a specific packet or flow would egress a network device. The tool can take into account forwarding decisions as well as load balancing. The tool may show how a packet or flow would transit through a network device given the current software and hardware configuration of the network device by using the actual forwarding hardware of the network device for the prediction. A user of such a network device can provide input describing a packet (e.g., an ingress interface of the network device, a type of packet, values for fields in the header of the packet, etc.) to track through the network device. Such a packet may be referred to as a test packet. Based on the input, the network device generates the test packet and some metadata indicating the ingress interface of the test packet and that the test packet is a test packet. Next, the network device injects the test packet and the metadata into the hardware processing pipeline of the network device. In some embodiments, the network device injects a test packet into the hardware processing pipeline so that, from the perspective of the hardware processing pipeline, the test packet appears to have been received at the specified ingress interface of the network device. Based on the configuration of the hardware processing pipeline (e.g., forwarding tables), the hardware processing pipeline processes the test packet to determine an egress network interface of the network device to which the test packet is to be forwarded. Before the test packet exits out of the egress interface, the network device captures the test packet and sends it to a software application executing on a CPU of the network device. The software application analyzes the test packet to determine the egress interface of the network device that the test packet would have exited out of. The techniques for predicting forwarding destinations are particularly useful in the cases of link aggregation groups (LAGs) and equal cost multipath routes (ECMPs) where a hashing algorithm may be used to determine which network interface to forward packets out of the network device.

1. Example Network Device

Figure 1:
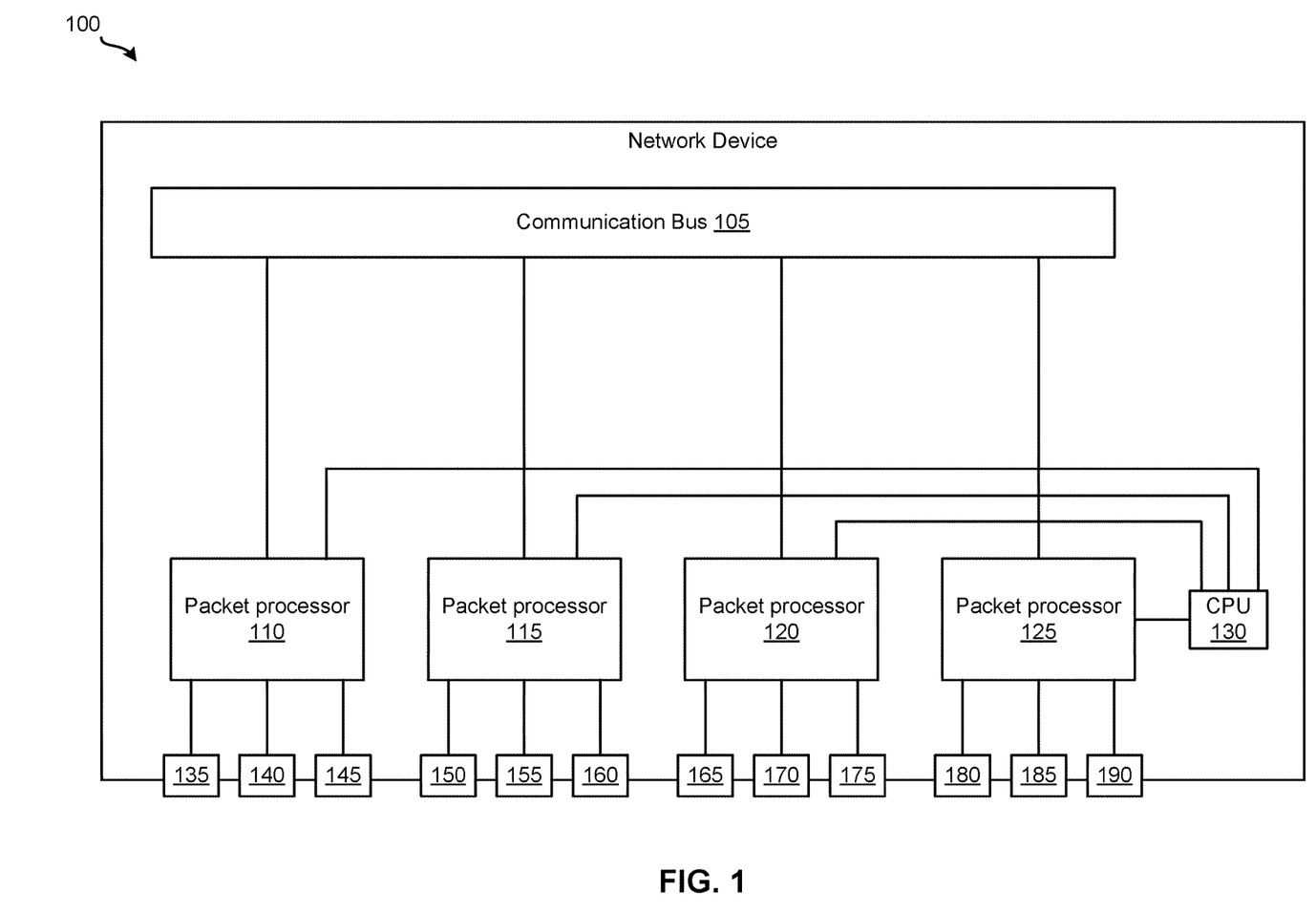
FIG. 1 illustrates a network device according to some embodiments.

FIG. 1 illustrates a network device 100 according to some embodiments. As shown, network device 100 includes communication bus 105, packet processors 110-125, central processing unit (CPU) 130, and ports 135-190. Communication bus 105 is communicatively coupled to packet processors 110-125 and is configured to facilitate communication between packet processors 110-125. In some embodiments, communication bus 105 may be implemented using one or more fabric modules. Ports 135-190 may be physical network interfaces of network device 100 that can each be connected to other network devices (not shown).

Each of the packet processors 110-125 is configured to process packets received at network interfaces (e.g., ports 135-190) of network device 100. As shown, in this example, packet processor 110 is communicatively coupled to ports 135-145, packet processor 115 is communicatively coupled to ports 150-160, packet processor 120 is communicatively coupled to ports 165-175, and packet processor 125 is communicatively coupled to ports 180-190. When a packet is received at one of the ports 135-190, the packet processor coupled to the port at which the packet is received may perform ingress processing operations on the packet. In some embodiments, the ingress processing operations include determining which egress network interface (e.g., one of the ports 145-190) to send the packet out of network device 100. After the packet processor finishes performing the ingress processing operations, it sends, via communication bus 105, the packet to one of the packet processors 110-125 for egress processing. The packet processor that performs egress processing operations on the packet may be the same packet processor that performed the ingress processing operations or it may be a different packet processor.

The egress processing operations can include forwarding the packet out of the determined egress network interface of the network device 100.

As illustrated in FIG. 1, CPU 130 is communicatively coupled to each of the packet processors 110-125 (e.g., via peripheral component interconnect (PCI) express links). CPU 130 may execute software (e.g., a control software application) for, among other functions, controlling packet processors 110-125, generating test packets, and injecting test packets into a hardware packet processing pipeline of network device 100.

2. Example Hardware Packet Processing Pipeline

Figure 2:
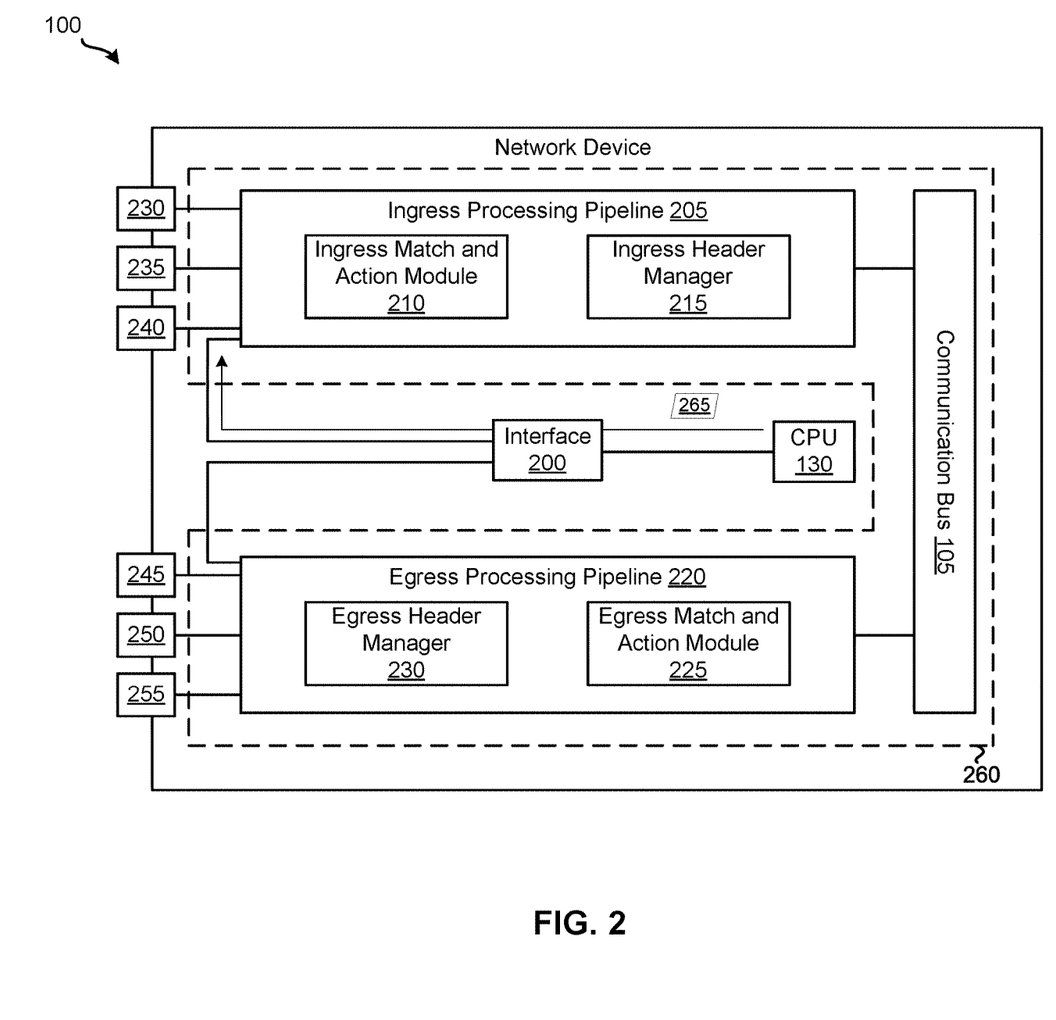
FIGS. 2-7 illustrate an example flow through a hardware packet processing pipeline according to some embodiments.

This section will describe an example operation of network device 100. Before the example operation is described, an example hardware packet processing pipeline of network device 100 will be described by reference to FIG. 2. FIG. 2 illustrates network device 100 according to some embodiments. As illustrated, network device 100 includes interface 200, CPU 130, hardware packet processing pipeline 260, and ports 230-255.

Interface 200 is configured to serve as an interface between CPU 130 and hardware packet processing pipeline 260 (e.g., ingress processing pipeline 205 and egress processing pipeline 220). For example, interface 200 may receive from CPU 130 a test packet that is to be injected into ingress processing pipeline 205. Interface 200 can perform some operations for the test packet and then send the test packet to ingress processing pipeline 205. Interface 200 may also receive a test packet from hardware packet processing pipeline 260 (e.g., ingress processing pipeline 205 or egress processing pipeline 220) that has been processed by hardware packet processing pipeline 260. When interface 200 receives such a packet, interface 200 forwards it to CPU 300.

In this example, hardware packet processing pipeline 260 is a logical representation of a hardware packet processing pipeline of network device 100. For example, any of the packet processors 110-125 may be ingress processing pipeline 205. In some embodiments, the packet processor that acts as ingress processing pipeline 205 is the packet processor 110-125 that is connected to the port at which the packet to be processed by ingress processing pipeline 205 is received. Any of the packet processors 110-125 can be egress processing pipeline 220. In some embodiments, the packet processor that acts as egress processing pipeline 220 is the packet processor 110-125 that is connected to the port of which the packet to be processed by egress processing pipeline 220 is to exit out. As such, in some instances, the packet processor that is ingress processing pipeline 205 is also the packet processor that is egress processing pipeline 220. In other instances, the packet processor that is ingress processing pipeline 205 is different than the packet processor that is egress processing pipeline 220.

As shown in FIG. 2, ingress processing pipeline 205 includes ingress match and action module 210 and ingress header manager 215. Ingress match and action module 210 is configured to inspect metadata associated with packets. In some embodiments, ingress match and action module 210 stores a set of rules that each specifies a pattern and a set of actions. While inspecting a packet, if ingress match and action module 210 finds a rule in the set of rules with a pattern that matches the metadata, ingress match and action module 210 performs the set of actions specified in the rule with the matching pattern. Ingress header manager 215 handles the generation of system headers (i.e., metadata) associated with packets. For example, ingress header manager 215 may generate a set of system headers for a packet and append them to the packet. As such, these system headers are separate from the original packet (i.e., the system headers are not included in the original packet).

Egress processing pipeline 220 includes egress match and action module 225 and egress header manager 230. Egress match and action module 225 is responsible for inspecting metadata associated with packets. In some embodiments, egress match and action module 225 stores a set of rules that each specifies a pattern and a set of actions. During inspection of a packet, if egress match and action module 225 finds a rule in the set of rules with a pattern that matches the metadata, egress match and action module 225 performs the set of actions specified in the rule with the matching pattern. Egress header manager 230 is responsible for managing system headers associated with packets. For example, in some instances, egress header manager 230 can determine which, if any, system headers associated with a packet, are to be kept before the packet is sent out of egress processing pipeline 220.

Ports 230-255 are similar to ports 135-190 shown in FIG. 1. That is, ports 230-255 may be physical network interfaces of network device 100 that can each be connected to other network devices. As mentioned above, any of the packet processors 110-125 may be ingress processing pipeline 205 and any of the packet processors 110-125 may be egress processing pipeline 220. Ports 230-240 may be the ports that are connected to the packet processor acting as ingress processing pipeline 205. For instance, if packet processor 115 is ingress processing pipelined 205, then ports 150-160 are ports 230-240. Similarly, ports 245-255 can be the ports that are connected to the packet processor acting as egress processing pipeline 220. For example, if packet processor 125 is egress processing pipelined 220, then ports 180-190 are ports 245-255.

An example operation of network device 100 will now be described by reference to FIGS. 2-7. Specifically, the example operation will show a flow of a test packet through hardware packet processing pipeline 260 of network device 100. For this operation, a tool (e.g., a control software application) executing on CPU 130 of network device is provided to a user. The operation starts by the user using the tool to provide values for a test packet (e.g., through a command line interface provided by the tool). The user may specify an ingress network interface of network device 100 at which the test packet is to ingress, a packet type (e.g., a Ethernet packet, an Internet protocol (IP) version 4 (IPv4) packet, an IP protocol version 6 (IPv6) packet, etc.), and layer 2 header values (e.g., a source media access control (MAC) address, a destination MAC address, an Ethernet type, a virtual local area network (VLAN) identifier (ID), etc.). Optionally, the user can also specify layer 3 header values (e.g., a source Internet protocol (IP) address, a destination IP address, an IP protocol (e.g., IPv4, IPv6, etc.), IP time to live (TTL), hop limit, flow label, etc.) and/or a layer 4 header (e.g., a user datagram protocol (UDP) header, a transmission control protocol (TCP) header, etc.) values. Instead of providing network device 100 values for a test packet, the user can provide network device 100 a raw packet (e.g., a partially or fully formed packet that already includes values in the various fields of the packet).

Next, the tool generates a packet that includes the values specified by the user and sends the packet to interface 200. As shown in FIG. 2, CPU 130 (i.e., the tool executing on CPU 130) is sending a packet 265 to interface 200. In addition, the tool generates a set of internal headers associated with the packet and appends them to the packet. The set of internal headers with packet 265 may include metadata that contains a marker indicating that packet 265 is a test packet. In some embodiments, the marker is a particular set of bits in the metadata that is set to a defined value (e.g., 0, 1, 5, etc.). In this example, the particular set of bits in the metadata is set to a value of 1 to indicate that the packet is a test packet. The set of internal headers associated with packet 265 also includes data indicating the ingress network interface (e.g., one of the ports 230-240) at which packet 265 is to be received.

As explained above, any of the packet processors 110-125 may be ingress processing pipeline 205. For this example, interface 200 is a component that is included in the packet processor that is acting as ingress processing pipeline 205. As such, interface 200 may be considered as part of ingress processing pipeline 205. When interface 200 receives from CPU 130 packet 265 and the set of internal headers associated with packet 265, interface 200 sends packet 265 through ingress processing pipeline 205 where some operations may be performed on packet 265 before ingress match and action module 210 receives packet 265.

Figure 3:
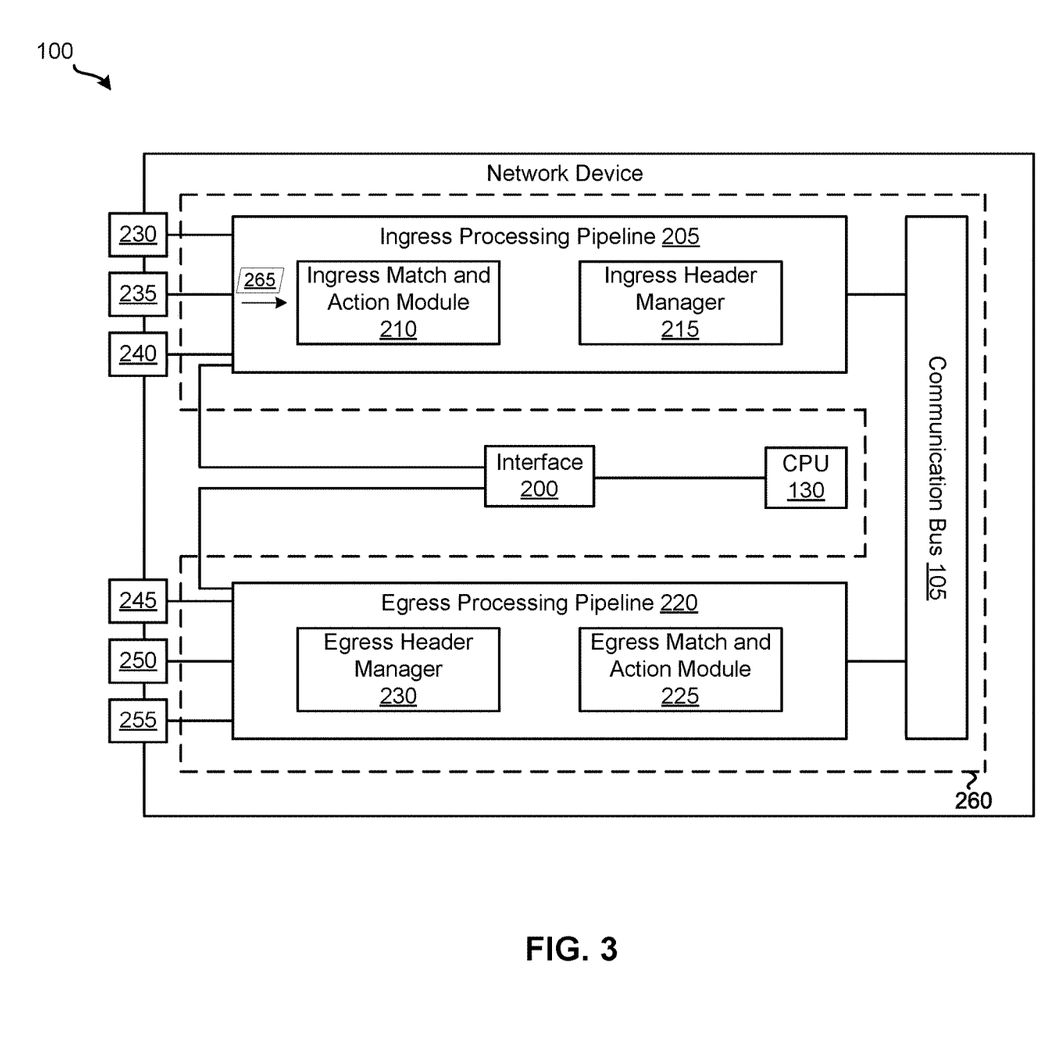

Upon receiving packet 265, ingress processing pipeline 205 performs various functions including determining an egress network interface for packet 265. As explained above, the set of internal headers associated with packet 265 includes data indicating the ingress network interface (e.g., one of the ports 230-240) at which packet 265 is to be received. However, packet 265 is actually received from interface 200. Thus, from the perspective of ingress processing pipeline 205, packet 265 ingressed at the specified ingress network interface even though packet 265 was in fact injected into ingress processing pipeline 205 via interface 200. As illustrated in FIG. 3, ingress match and action module 210 receive packet 265. In response, ingress match and action module 210 inspects the set of internal headers associated with packet 265. As mentioned above, in some embodiments, ingress match and action module 210 stores a set of rules that each specifies a pattern and a set of actions. In this example, when ingress match and action module 210 is inspecting the set of internal headers associated with packet 265, ingress match and action module 210 finds a rule in the set of rules specifying the following pattern that matches the set of internal headers: the particular set of bits in the set of internal headers is set to the value of 1. The set of operations specified for the rule includes an operation for creating a set of instructions for ingress header manager 215 to include a marker indicating that packet 265 is a test packet in a particular system header generated by ingress header manage 215. In some embodiments, the marker in the system header is a particular set of bits in the system header that is set to a defined value (e.g., 0, 1, 4, etc.). In this example, the particular set of bits in the system header is set to a value of 1 to indicate that packet 265 is a test packet. Effectively, the marker in the set of internal headers is propagated to the system header. This is done because the set of internal headers is not transmitted through the rest of ingress processing pipeline 205 or egress processing pipeline 220. However, system headers are retained throughout the processing of packet 265 through ingress processing pipeline 205 and egress processing pipeline 220.

Figure 4:
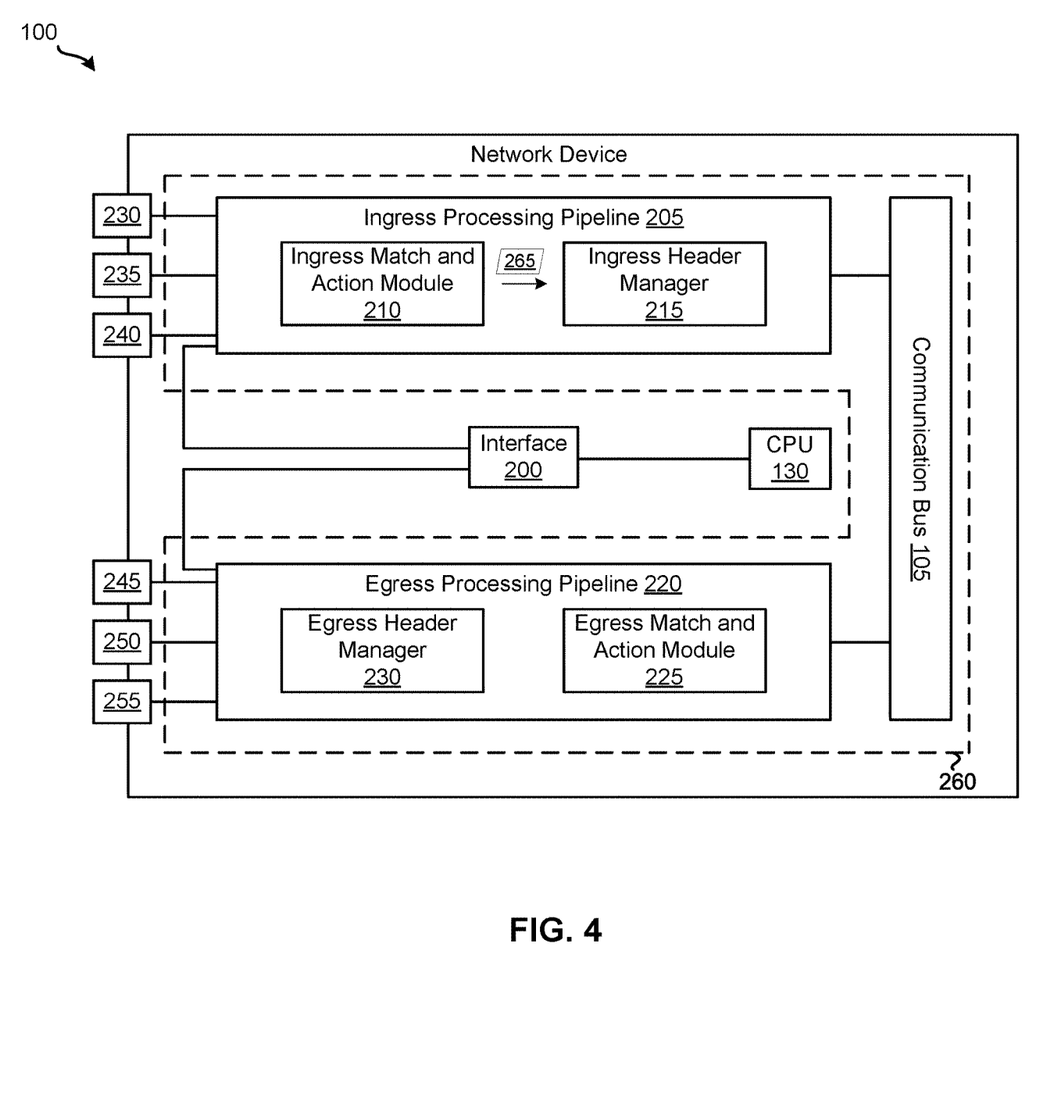

FIG. 4 illustrates ingress match and action module 210 sending packet 265 to ingress header manager 215. For this example, ingress match and action module 210 also sends ingress header manager 215 the set of instructions instructing ingress header manager 215 to include a marker indicating that packet 265 is a test packet in a particular system header generated by ingress header manager 215. When ingress header manager 215 receives packet 265, ingress header manager 215 generates a set of system headers associated with packet 265 and appends them to packet 265. The set of system headers includes a system header that includes the marker indicating that packet 265 is a test packet. Also, the set of system headers includes another system header for storing the egress network interface that packet 265 is determined to exit out of network device 100. After ingress header manager 215 has generated the set of system headers for packet 265, ingress header manager 215 passes packet 265 and the set of system headers to the rest of ingress processing pipeline 205 for further processing.

Figure 5:
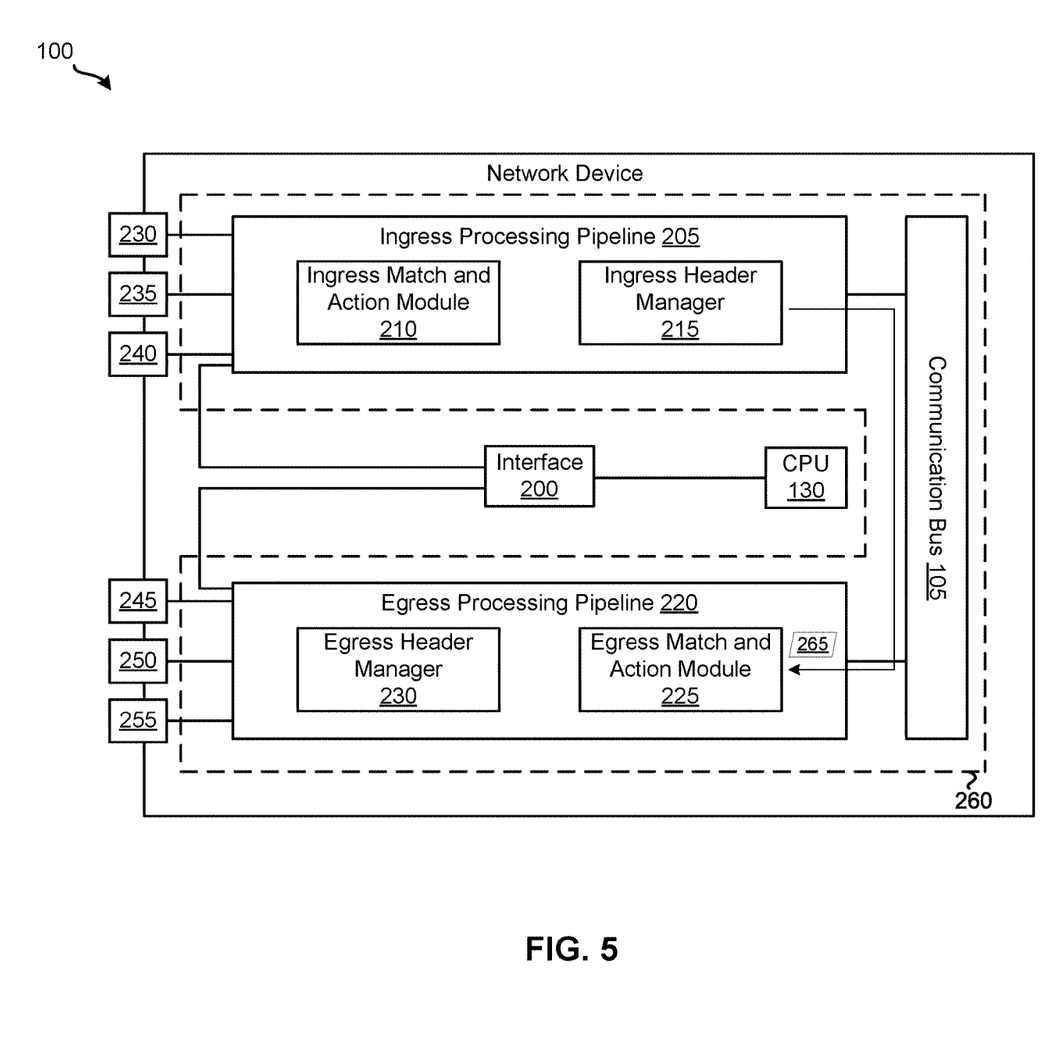

FIG. 5 illustrates packet 265 after it has been processed through ingress processing pipeline 205. As shown, ingress processing pipeline 205 sends packet 265 to egress processing pipeline 220 via communication bus 105. As described above, in some embodiments, egress match and action module 225 stores a set of rules that each specifies a pattern and a set of actions. When egress match and action module 225 receives packet 265, egress match and action module 225 starts inspecting the set of system headers associated with packet 265. For this example, during inspection of the set of system headers, egress match and action module 225 finds a rule in the set of rules specifying the following pattern that matches a system header in the set of system headers: the particular set of bits in the system header that is for storing a marker indicating that packet 265 is a test packet is set to the value of 1. The set of operations specified for the rule include an operation for instructing egress header manager 230 to retain the system header that includes the marker indicating that packet 265 is a test packet and retain the system header that is for storing the egress network interface. In some embodiments, the set of operations specified for the rule includes an operation for specifying that packet 265 be redirected to a specific interface (e.g., a recirculation interface or a CPU interface). The specific interface may have a configuration applied that egress header manager 230 looks up to determine what processing to perform. In this manner, egress match and action module 225 can indirectly pass instructions to egress header manager 230.

Figure 6:
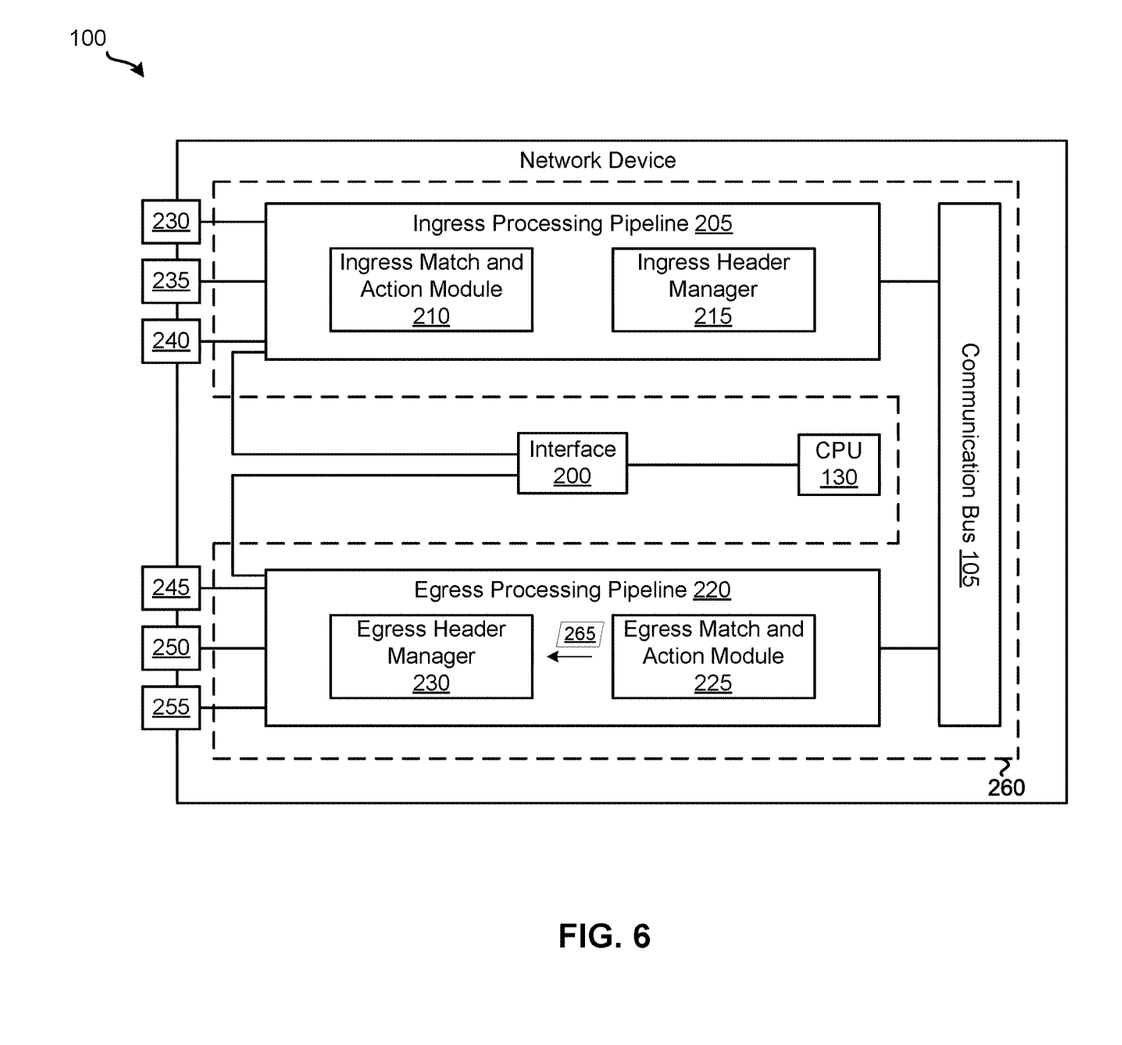

FIG. 6 illustrates egress match and action module 225 sending packet 265 to egress header manager 230. In this example, egress match and action module 225 also sends egress header manager 2230 the set of instructions instructing egress header manager 230 to retain the system header that includes the marker indicating that packet 265 is a test packet. Upon receiving packet 265, egress header manager 230 may remove one or more system headers from the set of system headers associated with packet 265. However, egress header manager 230 makes sure to retain the system header that includes the marker indicating that packet 265 is a test packet as well as the system header that is for storing the egress network interface. In some embodiments, egress header manager 230 retains all the system headers associated with packet 265. Egress header manager 230 then passes packet 265 and the set of system headers to the rest of egress processing pipeline 220 for further processing.

Figure 7:
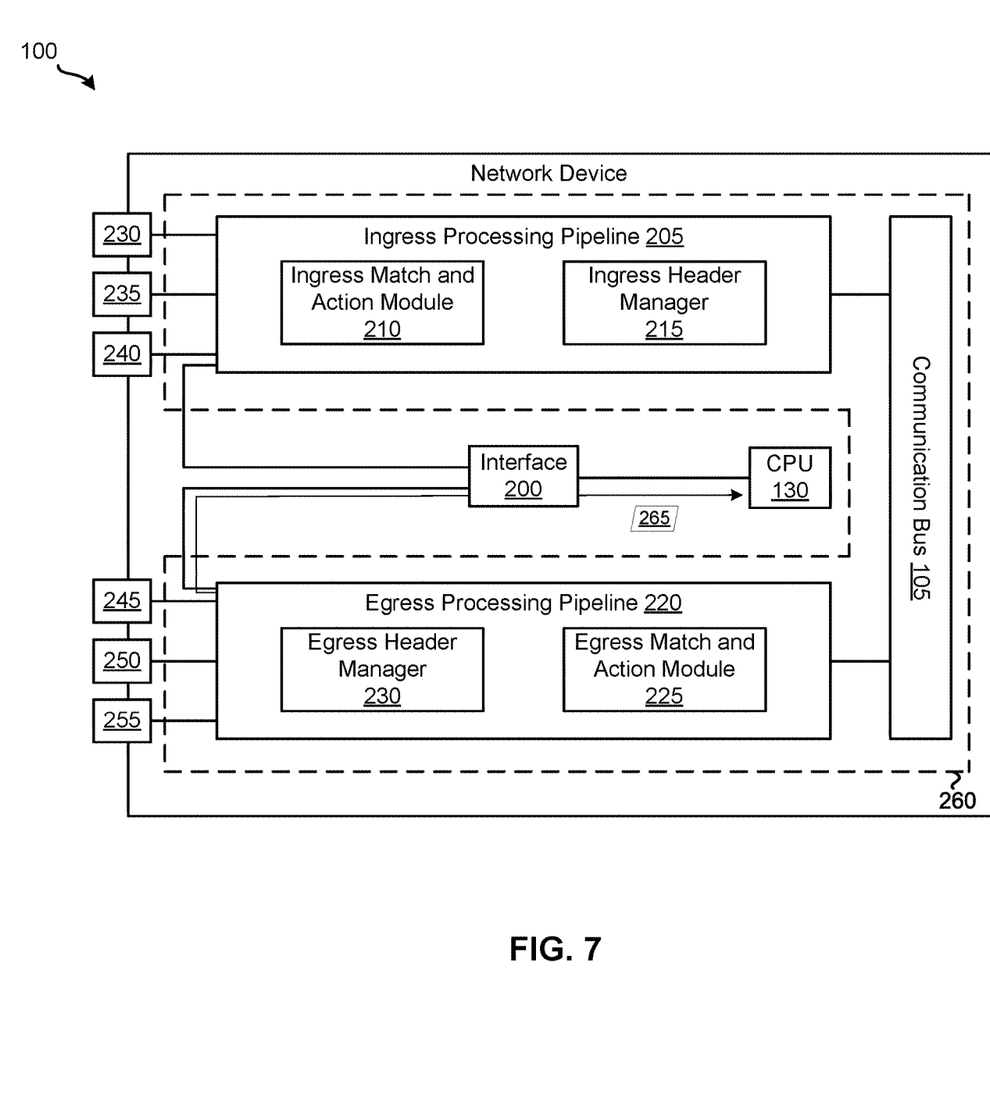

As mentioned above, in some embodiments, the set of operations specified for the rule includes an operation for specifying that packet 265 be redirected to a specific interface. In this example, the specific interface is interface 200 (i.e., the interface for CPU 130). Once egress processing pipeline 220 is done processing packet 265, egress processing pipeline 220 sends packet 265 to interface 200. Then, interface 200 forwards packet 265 to CPU 130, as illustrated in FIG. 7. As mentioned above, any of the packet processors 110-125 may be egress processing pipeline 220. In this example, interface 200 is a component that is included in the packet processor that is acting as egress processing pipeline 220. Therefore, interface 200 may be considered as part of egress processing pipeline 220. In cases where the packet processor that is ingress processing pipeline 205 is different than the packet processor that is egress processing pipeline 220, the interface 200 that is used to inject packet 265 into ingress processing pipeline 205 and the interface 200 that is used to forward packet 265 to CPU 130 are similarly different components. When the tool executing on CPU 130 receives packet 265, the tool inspects the system headers associated with packet 265. Specifically, the tool inspects the system header that is configured to store the marker indicating that packet 265 is a test packet and checks that the marker is stored in the system header to ensure that packet 265 is in fact a test packet. In addition, the tool inspects the system header storing the egress network interface. In some embodiments, the tool provides the egress network interface to the user.

3. Example Capturing of Test Packet

Figure 8:
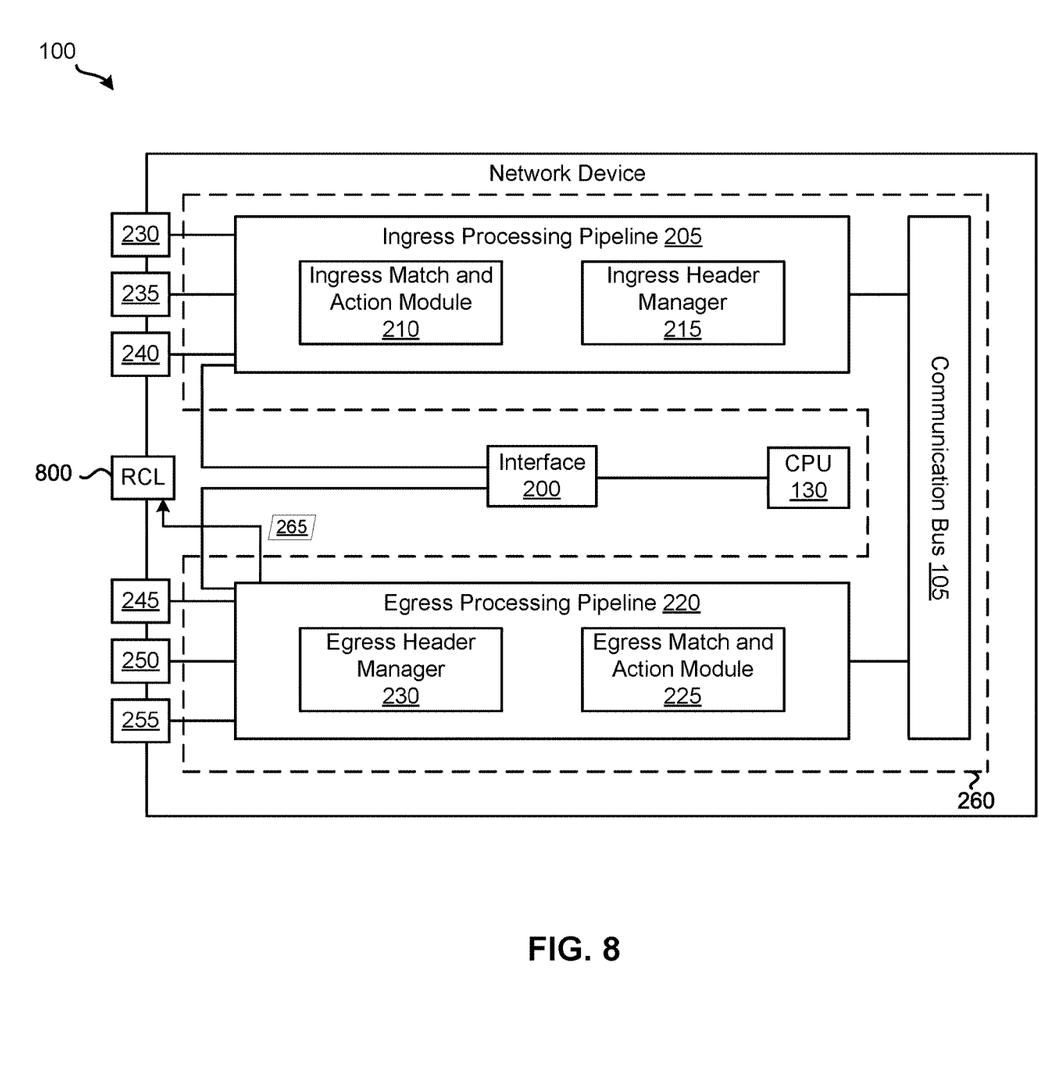
FIGS. 8-10 illustrate an example flow through another hardware packet processing pipeline according to some embodiments.

The example operation described above by reference to FIGS. 2-7 show one way of sending a test packet to CPU 130. An example of another method of sending a test packet to CPU 130 for analysis will be described by reference to FIGS. 8-10. This example is continues from FIG. 5. However, in this example, the set of operations specified for the rule that egress match and action module 225 finds includes an operation for specifying that packet 265 be redirected to a recirculation interface so that packet 265 is recirculated back into hardware packet processing pipeline 260. Thus, after egress header manager 230 passes packet 265 and the set of system headers to the rest of egress processing pipeline 220 for further processing, egress processing pipeline 220 sends packet 265 to recirculation interface 800, which is configured to transmit packets back into hardware packet processing pipeline 260. FIG. 8 illustrates egress processing pipeline 220 sending packet 265 to recirculation interface 800.

Figure 9:
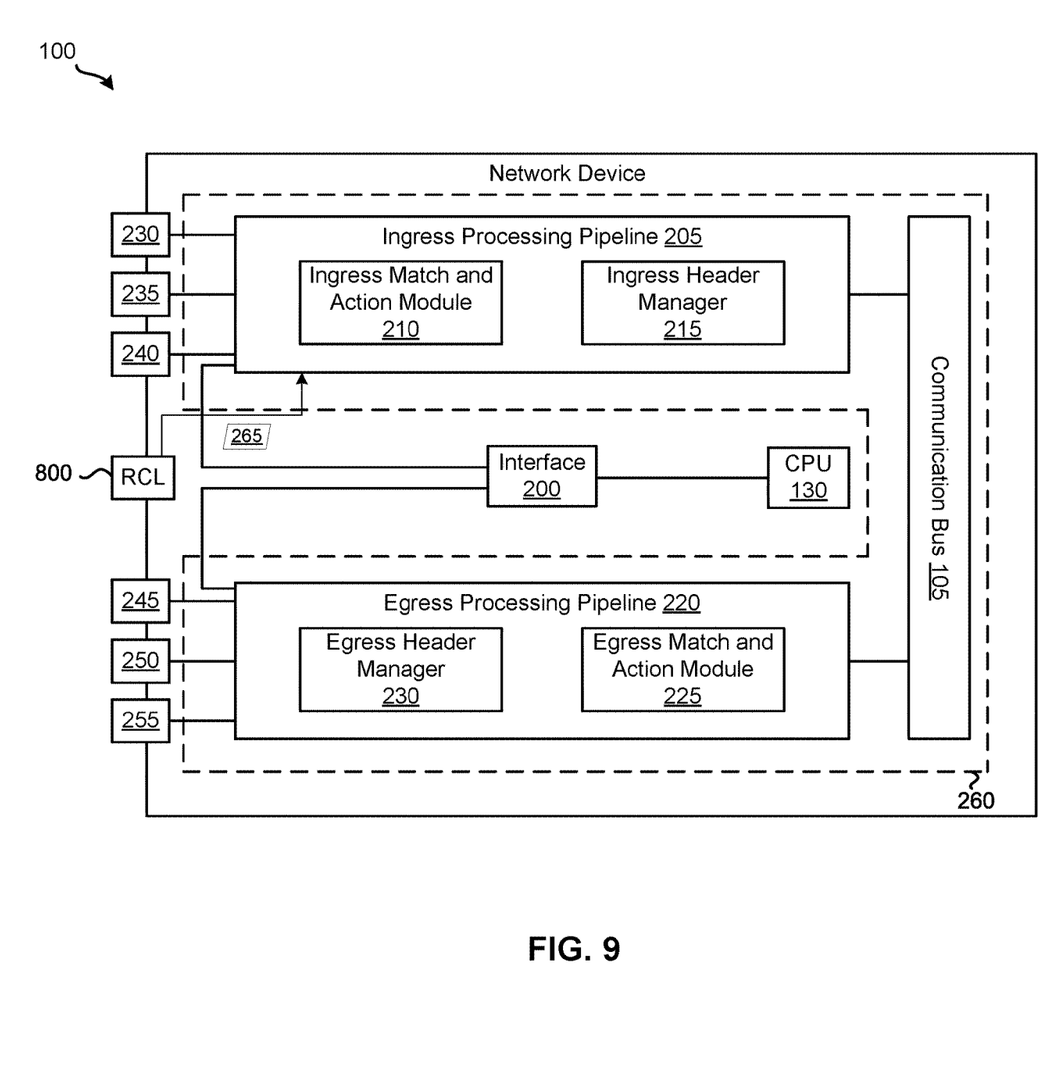
Figure 10:
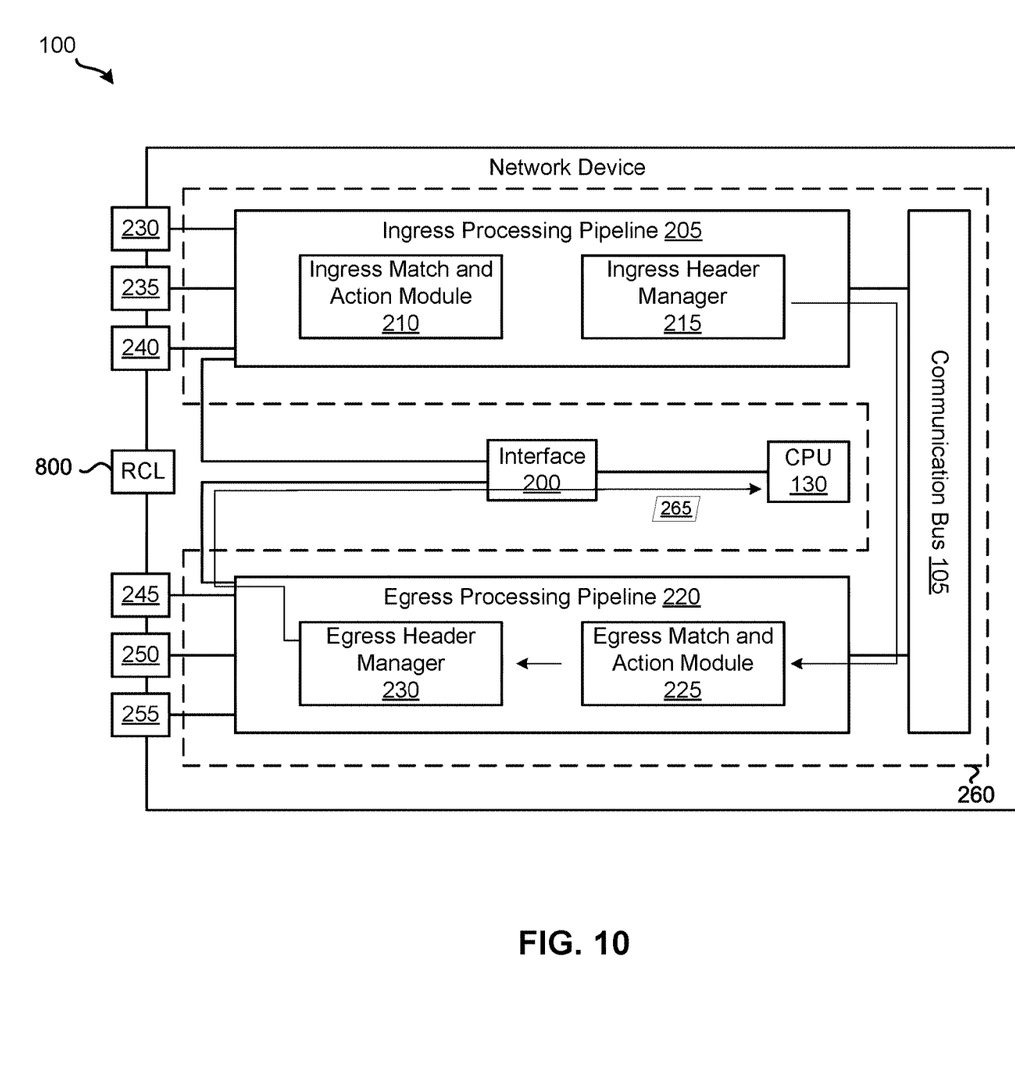

When recirculation interface 800 receives packet 265, it sends packet 265 (and the system headers associated with 265) back into ingress processing pipeline 205 for further processing. FIG. 9 illustrates recirculation interface 800 sending packet 265 to ingress processing pipeline 205. Upon receiving packet 265, ingress processing pipeline 205 determines the interface at which packet 265 was received. For this example, the interface is recirculation interface 800. In response, ingress processing pipeline 205 sends packet 265 to interface 200, which forwards packet 265 to CPU 130. FIG. 10 illustrates ingress processing pipeline 205 sending packet 265 to egress processing pipeline 220. Upon receiving packet 265, egress processing pipeline 220 processes packet 265 and forwards it to CPU 130 via interface 200. Similarly to the example above, when the tool executing on CPU 130 receives packet 265, the tool inspects the system headers associated with packet 265. The tool inspects the system header storing the egress network interface and, in some embodiments, the tool provides the egress network interface to the user.

5. Example Process

Figure 11:
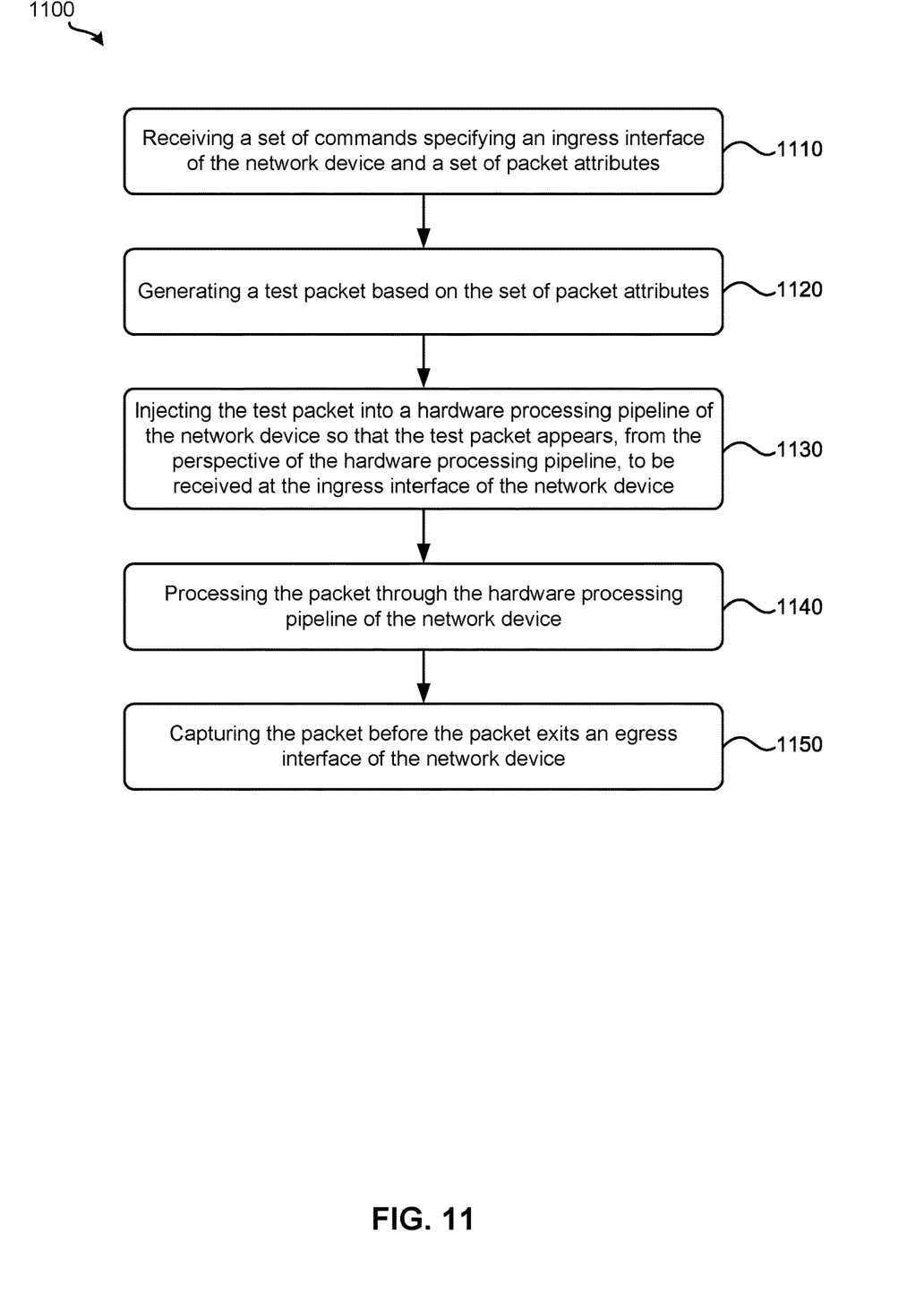
FIG. 11 illustrates a process for predicting forwarding destinations according to some embodiments.

FIG. 11 illustrates a process 1100 for predicting forwarding destinations according to some embodiments. Process 1100 starts by receiving, at 1110, a set of commands specifying an ingress interface of the network device and a set of packet attributes. Referring to FIG. 2 as an example, the tool executing on CPU 130 may receive the set of commands from a user of network device 100. In some embodiments, the set of commands are received through a command line interface provided by the tool.

Next, process 1100 generates, at 1120, a test packet based on the set of packet attributes. Referring to FIG. 2 as an example, the tool executing on CPU 130 can generate the test packet based on the packet attributes. The tool can also generate a set of internal headers associated with the test packet and appends them to the test packet. The set of internal headers associated with test packet may include metadata containing a marker indicating that the test packet is a test packet. The set of internal headers associated with the packet may also include data indicating the ingress network interface (e.g., one of the ports 230-240) at which the packet is to be received.

Process 1100 then injects, at 1130, the test packet into a hardware packet processing pipeline of the network device so that the test packet appears, from the perspective of the hardware packet processing pipeline, to be received at the ingress interface of the network device. Referring to FIG. 2 as an example, the tool executing on CPU 130 sends the test packet and the set of internal headers associated with the test packet to interface 200. Upon receiving the test packet and the set of internal headers, interface 200 sends the test packet to ingress processing pipeline 205.

At 1140, process 1100 processes the test packet through the hardware packet processing pipeline of the network device. Referring to FIGS. 3-6 as an example, ingress processing pipeline 205 can performs various functions including determining an egress network interface for packet 265. Next, ingress match and action module 210 may inspect the set of internal headers associated with the test packet and find a rule specifying the following pattern that matches the set of internal headers: the particular set of bits in the set of internal headers is set to the value of 1. The set of operations specified for the rule includes an operation for creating a set of instructions for ingress header manager 215 to generate a system header that includes a marker indicating that the test packet is a test packet. Ingress match and action module 210 then sends ingress header manager 215 the test packet and the set of instructions instructing ingress header manager 215 to generate a system header that includes a marker indicating that the test packet is a test packet.

Once ingress header manager 215 receives the test packet, ingress header manager 215 generates a set of system headers associated with the test packet and appends them to the test packet. The set of system headers includes a system header that includes the marker indicating that the test packet is a test packet. Also, the set of system headers includes another system header for storing the egress network interface that the test packet is determined to exit out of network device 100. When ingress header manager 215 finishes generating the set of system headers for the test packet, ingress header manager 215 passes the test packet and the set of system headers to the rest of ingress processing pipeline 205 for further processing.

After the test packet has been processed through ingress processing pipeline 205, ingress processing pipeline 205 sends the test packet to egress processing pipeline 220 via communication bus 105. When egress match and action module 225 receives the test packet, egress match and action module 225 inspects the set of system headers associated with the test packet and finds a rule in the set of rules specifying the following pattern that matches a system header in the set of system headers: the particular set of bits in the system header that is for storing a marker indicating that the test packet is a test packet is set to the value of 1. The set of operations specified for the rule includes an operation for creating a set of instructions for egress header manager 230 to retain the system header that includes the marker indicating that the test packet is a test packet and retain the system header that is for storing the egress network interface. The set of operations specified for the rule may include an operation for specifying that packet 265 be redirected to a specific interface (e.g., a recirculation interface or a CPU interface). The specific interface may have a configuration applied that egress header manager 230 looks up to determine what processing to perform.

Egress match and action module 225 sends egress header manager 230 the test packet, the set of instructions instructing egress header manager 230 to retain the system header that includes the marker indicating that the test packet is a test packet. When egress header manager receives the test packet, egress header manager 230 removes zero or more system headers from the set of system headers associated with packet 265, but retains the system header that includes the marker indicating that the test packet is a test packet and the system header that is for storing the egress network interface. Then, egress header manager 230 passes the test packet and the set of system headers to the rest of egress processing pipeline 220 for further processing.

Finally, process 1100 captures, at 1150, the test packet before the test packet exits an egress interface of a plurality of egress interfaces of the network device. Referring to FIG. 7 as an example, egress processing pipeline 220 sends the test packet to interface 200, which forwards the test packet to CPU 130. Alternatively, process 1100 can send the test packet back into hardware packet processing pipeline 260, as described in the example above by reference to FIGS. 8-10, where egress processing pipeline 220 sends the test packet to CPU 130 via interface 200.

6. Further Examples

The following are some example embodiments of the present disclosure. In some embodiments, a method, executable by a network device, receives a set of commands specifying an ingress interface of the network device and a set of packet attributes. The method further generates a test packet based on the set of packet attributes. The method also injects the test packet into a hardware packet processing pipeline of the network device. The test packet appears to the hardware packet processing pipeline to have been received at the ingress interface of the network device. The method further processes the test packet through the hardware packet processing pipeline of the network device. The method also captures the test packet before the test packet exits an egress interface of a plurality of egress interfaces of the network device.

In some embodiments, generating the test packet may include marking the test packet with a marker. Marking the test packet with the marker may include generating metadata associated with the test packet that is separate from the test packet, wherein the metadata comprises the marker. The hardware packet processing pipeline may include an ingress match and action module that is configured to detect the marker associated with the packet. The marker may be a first marker. The hardware packet processing pipeline may further include an ingress header manager. The ingress match and action module may be further configured to, upon detecting the first marker associated with the packet, create a set of instructions for instructing the ingress header manager to generate a system header that includes a second marker. The ingress header manager may be configured to generate the system header. The hardware packet processing pipeline may include an ingress processing pipeline. The ingress match and action module and the ingress header manager may be included in the ingress processing pipeline.

In some embodiments, the hardware packet processing pipeline may include an egress match and action module that is configured to detect the second marker associated with the test packet. The hardware packet processing pipeline may further include an egress processing pipeline. The hardware packet processing pipeline may further include an egress header manager. The egress match and action module may be further configured to, upon detecting the second marker associated with the packet, instruct the egress header manager to retain the system header that includes the second marker. The egress header manager may be configured to retain the system header. The hardware packet processing pipeline may further include an egress processing pipeline. The egress match and action module and the egress header manager may be included in the egress processing pipeline.

In some embodiments, the network device may include a processor and a software application configured for execution by the processor. The method may further send the test packet to the software application after processing the test packet through the hardware packet processing pipeline. Sending the test packet to the software application may include recirculating the test packet back through the hardware packet processing pipeline. The software application may analyze the test packet to determine the test packet would have egressed out of the egress interface of the network device and present information indicating that the test packet would have egressed the egress interface of the network device. Processing the test packet through the hardware packet processing pipeline may include generating metadata associated with the test packet configured to store the egress interface that the test packet would have egressed out of the network device. The software application may analyze the test packet to determine the test packet would have egressed out of the egress interface of the network device by analyzing the metadata associated with the test packet.

In some embodiments, a network device includes a processor and a non-transitory machine-readable medium that stores instructions. The instructions cause the processor to receive a set of commands specifying an ingress interface of the network device and a set of packet attributes. The instructions further cause the processor to generate a test packet based on the set of packet attributes. The instructions also cause the processor to inject the test packet into a hardware packet processing pipeline of the network device. The test packet appears to the hardware packet processing pipeline to have been received at the ingress interface of the network device. The instructions further cause the processor to process the test packet through the hardware packet processing pipeline of the network device. The instructions also cause the processor to capture the test packet before the test packet exits an egress interface of a plurality of egress interfaces of the network device.

In some embodiments, generating the test packet may include marking the test packet with a marker. Marking the test packet with the marker may include generating metadata associated with the test packet that is separate from the test packet. The metadata may include the marker. The hardware packet processing pipeline may include an ingress match and action module that is configured to detect the marker associated with the packet. The network device may include a processor and a software application configured for execution by the processor. The method may further send the test packet to the software application after processing the test packet through the hardware packet processing pipeline. Sending the test packet to the software application may include recirculating the test packet back through the hardware packet processing pipeline.

In some embodiments, a non-transitory machine-readable medium stores a program executable by a processor of a network device. The program receives a request to process a test packet through a hardware processing pipeline of the network device. In response to the request, the program further generates the test packet. The program also processes the test packet through the hardware packet processing pipeline of the network device. Based on the processing, the program further determines an egress interface of the network device of which the test packet would have exited out.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method, executable by a network device, comprising:
receiving a set of commands, the set of commands specifying an ingress interface of the network device and a set of packet attributes;
generating, by a software application operating on the network device, a test packet based on the set of packet attributes;
sending, by the software application, the test packet to an interface of the network device other than the ingress interface of the network device, the interface of the network device other than the ingress interface of the network device configured to inject the test packet into a hardware packet processing pipeline of the network device, the test packet appearing to the hardware packet processing pipeline to have been received at the ingress interface of the network device;
processing the test packet through the hardware packet processing pipeline of the network device;
capturing the test packet before the test packet exits an egress interface of a plurality of egress interfaces of the network device; and
sending the processed test packet to the interface of the network device other than the ingress interface of the network device, the interface of the network device other than the ingress interface of the network device further configured to forward the test packet to the software application for analysis.

2. The method of claim 1, wherein generating the test packet comprises marking the test packet with a marker.

3. The method of claim 2, wherein marking the test packet with the marker comprises generating metadata associated with the test packet that is separate from the test packet, wherein the metadata comprises the marker.

4. The method of claim 2, wherein the hardware packet processing pipeline comprises an ingress match and action module that is configured to detect the marker associated with the test packet.

5. The method of claim 4, wherein the marker is a first marker, wherein the hardware packet processing pipeline further comprises an ingress header manager configured to generate a system header, wherein the ingress match and action module is further configured to, upon detecting the first marker associated with the test packet, create a set of instructions for instructing the ingress header manager to include a second marker in the system header.

6. The method of claim 5, wherein the hardware packet processing pipeline comprises an ingress processing pipeline, wherein the ingress match and action module and the ingress header manager are included in the ingress processing pipeline.

7. The method of claim 6, wherein the hardware packet processing pipeline comprises an egress match and action module that is configured to detect the second marker associated with the test packet.

8. The method of claim 7, wherein the hardware packet processing pipeline further comprises an egress header manager, wherein the egress match and action module is further configured to, upon detecting the second marker associated with the test packet, instruct the egress header manager to retain the system header that includes the second marker, wherein the egress header manager is configured to retain the system header.

9. The method of claim 8, wherein the hardware packet processing pipeline further comprises an egress processing pipeline, wherein the egress match and action module and the egress header manager are included in the egress processing pipeline.

10. The method of claim 1, wherein sending the processed test packet to the interface of the network device other than the ingress interface of the network device comprises recirculating the processed test packet back through the hardware packet processing pipeline.

11. The method of claim 10, wherein the interface of the network device other than the ingress interface of the network device is a first interface of the network device, wherein recirculating the processed test packet back through the hardware packet processing pipeline comprises sending the processed packet to a second interface of the network device, the second interface of the network device configured to transmit the processed test packet back through the hardware packet processing pipeline.

12. The method of claim 10, wherein the software application analyzes the test packet to determine the test packet would have egressed out of the egress interface of the network device and presents information indicating that the test packet would have egressed the egress interface of the network device.

13. The method of claim 12, wherein processing the test packet through the hardware packet processing pipeline comprises generating metadata associated with the test packet configured to store the egress interface that the test packet would have egressed out of the network device, wherein the software application analyzes the test packet to determine the test packet would have egressed out of the egress interface of the network device by analyzing the metadata associated with the test packet.

14. A network device comprising:
a processor; and
a non-transitory machine-readable medium storing instructions that when executed by the processor cause the processor to:
receive a set of commands, the set of commands specifying an ingress interface of the network device and a set of packet attributes;

generate, by a software application operating on the network device, a test packet based on the set of packet attributes;

sending, by the software application, the test packet to an interface of the network device other than the ingress interface of the network device, the interface of the network device other than the ingress interface of the network device configured to inject the test packet into a hardware packet processing pipeline of the network device, where the test packet appears to the hardware packet processing pipeline to have been received at the ingress interface of the network device;

process the test packet through the hardware packet processing pipeline of the network device;

capture the test packet before the test packet exits an egress interface of a plurality of egress interfaces of the network device; and send the processed test packet to the interface of the network device other than the ingress interface of the network device, the interface of the network device other than the ingress interface of the network device further configured to forward the test packet to the software application for analysis.

15. The network device of claim 14, wherein generating the test packet comprises marking the test packet with a marker.

16. The network device of claim 15, wherein marking the test packet with the marker comprises generating metadata associated with the test packet that is separate from the test packet, wherein the metadata comprises the marker.

17. The network device of claim 15, wherein the hardware packet processing pipeline comprises an ingress match and action module that is configured to detect the marker associated with the test packet.

18. The network device of claim 14, wherein sending the processed test packet to the interface of the network device other than the ingress interface of the network device comprises recirculating the processed test packet back through the hardware packet processing pipeline.

19. The network device of claim 18, wherein the interface of the network device other than the ingress interface of the network device is a first interface of the network device, wherein recirculating the processed test packet back through the hardware packet processing pipeline comprises sending the processed packet to a second interface of the network device, the second interface of the network device configured to transmit the processed test packet back through the hardware packet processing pipeline.

20. A non-transitory machine-readable medium storing a program executable by a processor of a network device, the program comprising sets of instructions for:

receiving a set of commands and a request to process a test packet through a hardware processing pipeline of the network device, the set of commands specifying an ingress interface of the network device and a set of packet attributes;

in response to the request, generating, by a software application operating on the network device, the test packet based on the set of packet attributes;

sending, by the software application, the test packet to an interface of the network device other than the ingress interface of the network device, the interface of the network device other than the ingress interface of the network device configured to injecting the test packet into a hardware packet processing pipeline of the network device;

processing the test packet through the hardware packet processing pipeline of the network device, where the test packet appears to the hardware packet processing pipeline to have been received at the ingress interface of the network device;

sending the processed test packet to the interface of the network device other than the ingress interface of the network device, the interface of the network device other than the ingress interface of the network device further configured to forward the test packet to the software application for analysis; and based on the processing, determining, by the software application, an egress interface of the network device of which the test packet would have exited out.

* * * * *